(12) United States Patent
Liu (10) Patent No.: US 10,784,796 B2
(45) Date of Patent: Sep. 22, 2020

(54) ELECTRONIC DEVICE AND POWER SUPPLY METHOD THEREOF

(71) Applicant: Wistron Corporation, New Taipei (TW)

(72) Inventor: Wei-Lun Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 89 days.

(21) Appl. No.: 16/286,487

(22) Filed: Feb. 26, 2019

(65) Prior Publication Data
US 2020/0169183 A1     May 28, 2020

(30) Foreign Application Priority Data
Nov. 28, 2018    (TW) .............................. 107142570 A (51) Int. Cl.
*H02M 7/219*     (2006.01)
*H04N 1/00*      (2006.01)
*G06F 1/3234*    (2019.01)

(52) U.S. Cl.
CPC .......... *H02M 7/219* (2013.01); *G06F 1/3265* (2013.01); *H04N 1/00347* (2013.01); *G09G 2330/022* (2013.01)

(58) Field of Classification Search
CPC ........................... H02M 7/219; G09G 2340/00
See application file for complete search history.

(56) References Cited

U.S. PATENT DOCUMENTS 3,323,033 A * 5/1967 Tesdall .................. H02M 5/458
                                                363/36
3,898,522 A * 8/1975 Klein ....................... H04N 3/20
                                                315/379
(Continued)

FOREIGN PATENT DOCUMENTS

CN      207460205      6/2018
CN      207460540      6/2018
(Continued)

OTHER PUBLICATIONS

"Office Action of Taiwan Counterpart Application", dated Aug. 8, 2019, pp. 1-10.
(Continued)

*Primary Examiner* — Yusef A Ahmed
(74) *Attorney, Agent, or Firm* — JCIPRNET (57) ABSTRACT

An electronic device and a power supply method thereof are provided. The electronic device includes a plurality of power terminals, a plurality of bridge rectifiers, a detector, a power supply circuit, and a basic device. The detector detects current directions of currents flowing through the power terminals. The power supply circuit is electrically coupled to the power terminals through the bridge rectifiers. The basic device obtains power from the power supply circuit. At least two of the power terminals are selectively electrically coupled to an external power line. The power supply circuit supplies power to the basic device from the external power line through the bridge rectifiers. The basic device controls the power supply circuit according to the current directions of the at least two of the power terminals electrically coupled to the external power line, so as to output power between another at least two of the power terminals.

11 Claims, 10 Drawing Sheets

(56) References Cited

U.S. PATENT DOCUMENTS

| | | | | |
|---|---|---|---|---|
| 5,686,884 A * | 11/1997 | Larkin | | G08B 1/08 |
| | | | | 340/4.12 |
| 6,195,076 B1 * | 2/2001 | Sakuragi | | G09G 3/22 |
| | | | | 345/74.1 |
| 6,366,485 B1 * | 4/2002 | Fujisawa | | G04C 10/00 |
| | | | | 363/127 |
| 8,885,372 B1 * | 11/2014 | Nanut | | H02M 1/4233 |
| | | | | 363/69 |
| 9,357,599 B2 * | 5/2016 | Tomiyama | | F21K 9/27 |
| 9,743,470 B2 | 8/2017 | Tomiyama et al. | | |
| 2006/0007716 A1 * | 1/2006 | Takahashi | | H02M 7/219 |
| | | | | 363/89 |
| 2006/0126368 A1 * | 6/2006 | Rapeanu | | H02M 7/066 |
| | | | | 363/89 |
| 2006/0165220 A1 * | 7/2006 | Takahashi | | H05G 1/10 |
| | | | | 378/109 |
| 2010/0194296 A1 * | 8/2010 | Park | | H05B 45/37 |
| | | | | 315/185 R |
| 2011/0043127 A1 * | 2/2011 | Yamasaki | | H05B 45/37 |
| | | | | 315/291 |
| 2011/0181219 A1 * | 7/2011 | Liegeois | | H02P 29/02 |
| | | | | 318/400.29 |
| 2013/0114970 A1 * | 5/2013 | Minobe | | G03G 15/80 |
| | | | | 399/88 |
| 2013/0154492 A1 * | 6/2013 | Summerland | | H02M 7/06 |
| | | | | 315/200 R |
| 2013/0286700 A1 * | 10/2013 | Im | | H02J 9/005 |
| | | | | 363/126 |
| 2014/0368742 A1 * | 12/2014 | Joo | | H02M 7/2176 |
| | | | | 348/730 |
| 2017/0039984 A1 * | 2/2017 | Joo | | G06F 3/147 |
| 2017/0310224 A1 * | 10/2017 | Joo | | G09G 3/3406 |
| 2018/0076745 A1 * | 3/2018 | Cox | | H02P 6/14 |
| 2019/0013691 A1 * | 1/2019 | Oshima | | G01R 31/52 |
| 2019/0032864 A1 * | 1/2019 | Xiong | | F21V 3/061 |
| 2019/0041008 A1 * | 2/2019 | Xiong | | H05K 1/00 |
| 2019/0326813 A1 * | 10/2019 | Li | | H02M 3/335 |
| 2020/0044458 A1 * | 2/2020 | Yoon | | H02J 7/00047 |
| 2020/0074920 A1 * | 3/2020 | Lee | | G09G 3/20 |

FOREIGN PATENT DOCUMENTS

| | | |
|---|---|---|
| TW | 201123960 | 7/2011 |
| TW | I361974 | 4/2012 |
| TW | I469687 | 1/2015 |

OTHER PUBLICATIONS

Electrical Engineering Stack Exchange.MHT, "ac—What would be the results of two bridge rectifiers in series," Available at: https://electronics.stackexchange.com/questions/174896/what-would-be-the-results-of-two-bridge-rectifiers-in-series.

* cited by examiner

ELECTRONIC DEVICE AND POWER SUPPLY METHOD THEREOF

CROSS-REFERENCE TO RELATED APPLICATION

This application claims the priority benefit of Taiwan application serial no. 107142570, filed on Nov. 28, 2018. The entirety of the above-mentioned patent application is hereby incorporated by reference herein and made a part of this specification.

BACKGROUND

Technical Field

The disclosure relates to a power supply technique. More particularly, the disclosure relates to an electronic device which can be adapted to, for example, an electronic photo frame, and a power supply method thereof.

Description of Related Art

With rapid development of the electronic technology, general users are familiar with electronic photo frames. When a user tries to arrange plural electronic photo frames in series or in parallel, the user has to consider the correct routing of the positive and negative power lines. That is, the user may feel confused while he or she has to find out which of the power terminal in each of the electronic photo frames is required to be connected to the positive power line or the negative power line. In addition, how to connect electronic photo frames with different shapes and arrangement orientations in a simple, fast, and correct manner is also an important issue at present.

SUMMARY

The disclosure provides an electronic photo frame and a power supply method thereof capable of allowing a user to freely arrange a plurality of electronic photo frames to be connected in series.

The disclosure provides an electronic device electrically coupled to an external power line to be supplied power by the external power line, and the electronic device includes a plurality of power terminals, a plurality of bridge rectifiers, a detector, a power supply circuit, and a basic device. Each of the bridge rectifiers is electrically coupled to at least one of the power terminals. The detector is electrically coupled to the power terminals and is configured to detect current directions of currents flowing through the power terminals. The power supply circuit is electrically coupled to the power terminals through the bridge rectifiers. The basic device is electrically coupled to the detector and obtains power from the power supply circuit. At least two of the power terminals are selectively electrically coupled to the external power line. The power supply circuit supplies power to the basic device from the external power line through the bridge rectifiers. The basic device controls the power supply circuit according to the current directions of the at least two of the power terminals electrically coupled to the external power line, so as to output power between another at least two of the power terminals.

The disclosure provides a power supply system including a power adapter, a plurality of power terminals, a plurality of bridge rectifiers, a detector, a power supply circuit, and a basic device. Each of the bridge rectifiers is electrically coupled to at least one of the power terminals. The detector is electrically coupled to the power terminals and is configured to detect current directions of currents flowing through the power terminals. The power supply circuit is electrically coupled to the power terminals through the bridge rectifiers. The basic device is electrically coupled to the detector and obtains power from the power supply circuit. At least two of the power terminals are selectively electrically coupled to the external power line. The power supply circuit supplies power to the basic device from the external power line through the bridge rectifiers. The basic device controls the power supply circuit according to the current directions of the at least two of the power terminals electrically coupled to the external power line, so as to output power between another at least two of the power terminals.

The disclosure provides a power supply method adapted to an electronic device and a power adapter. The power adapter is electrically coupled to the electronic device through an external power line. The power supply method includes the following steps. Current directions of currents flowing through a plurality of power terminals of an electronic photo frame are detected. Power is obtained from a power supply circuit of the electronic device. Power is supplied to a basic device from the external power line through a plurality of bridge rectifiers electrically coupled between the power terminals and the power supply circuit in the electronic device. At least two of the power terminals are selectively electrically coupled to the external power line. The power supply circuit is controlled by the basic device according to the current directions of the power terminals so that power is outputted between another at least two of the power terminals.

To sum up, in the electronic photo frame provided by the disclosure, random power terminals may be electrically coupled to the external power line, and the external power line may be used to hang the electronic photo frame. Accordingly, the user does not have to consider which of the positive line or the negative line of the external power line is required to be electrically coupled to which of the power terminals. In addition, the power supply system provided by the disclosure may detect whether a short circuit is caused in the electronic photo frame electrically coupled to the power adapter.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
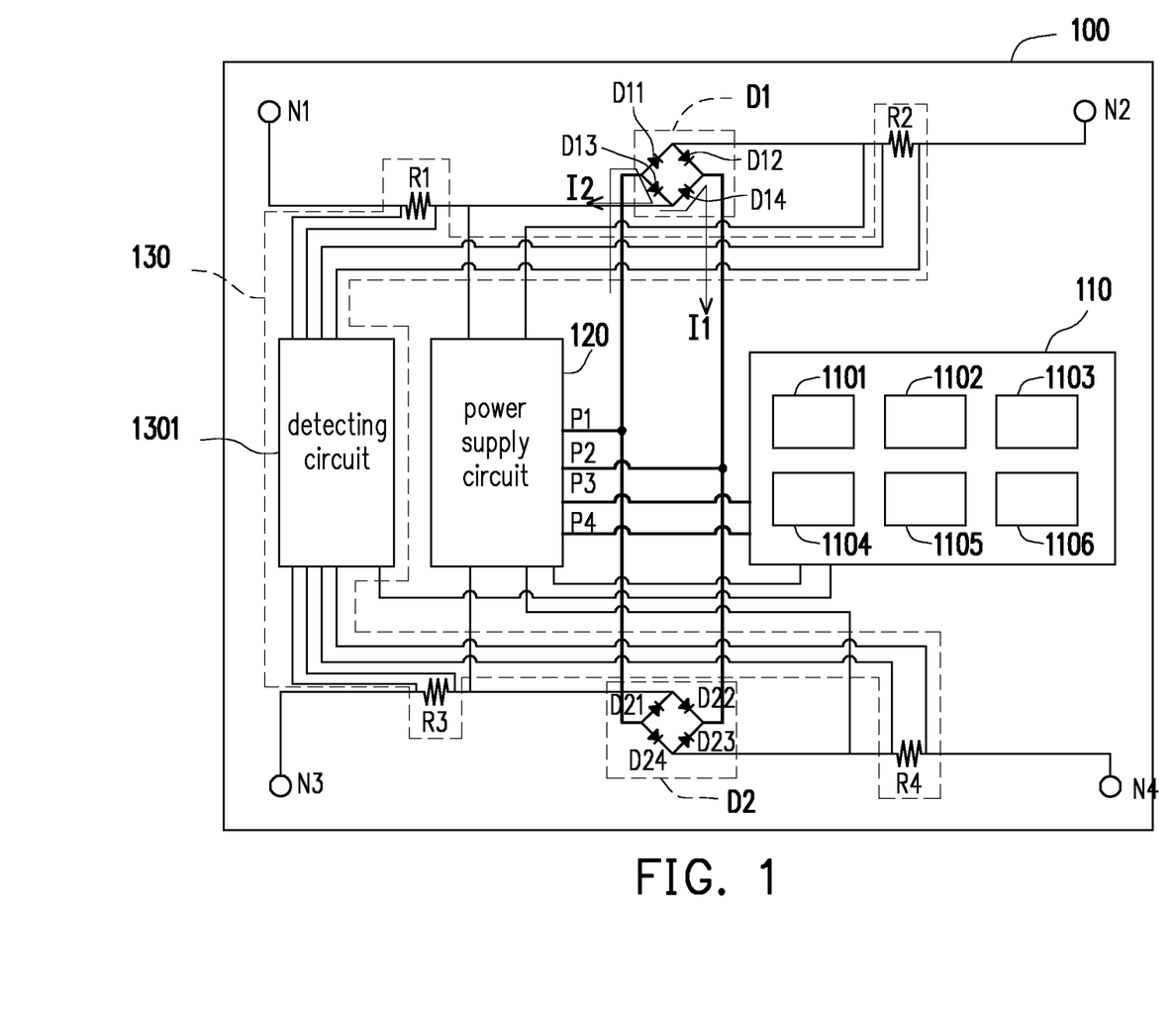
FIG. 1 is a schematic diagram of an electronic photo frame according to an embodiment of the disclosure.

The disclosure relates to an electronic device and a power supply method thereof. In order to illustrate the applications of the disclosure more clearly, an electronic photo frame is used as an example in the embodiments for description. With reference to FIG. 1, FIG. 1 is a schematic diagram of an electronic photo frame according to an embodiment of the disclosure. An electronic photo frame 100 provided by the embodiments of the disclosure includes a basic device 110, a power supply circuit 120, a detector 130, a plurality of power terminals N1 to N4, and a plurality of bridge rectifiers D1 to D2. Herein, the basic device 110 may be a circuit device or circuit devices required or preferably to be disposed in a general electronic photo frame and may include electronic elements and circuits such as a processor 1101 (e.g., a SoC), a display 1102, a power supplier 1103, a volatile memory 1104 (e.g., a DRAM) a non-volatile memory 1105 (e.g., a flash ROM), a communication module 1106 (e.g., a network), and/or a combination thereof. A number of the power terminals may be two or greater than two and a number of the bridge rectifiers may be any number, which are not particularly limited. The power terminals N1 and N2 are electrically coupled to the bridge rectifier D1, and the power terminals N3 and N4 are electrically coupled to the bridge rectifier D2. The detector 130 is electrically coupled to the power terminals N1 to N4 and may detect current directions of currents flowing through the power terminals N1 to N4. The power supply circuit 120 is electrically coupled to the power terminals N1 and N2 through the bridge rectifier D1 and is electrically coupled to the power terminals N3 and N4 through the bridge rectifier D2. Herein, the bridge rectifier D1 may be composed of diodes D11 to D14 and the bridge rectifier D2 may be composed of diodes D21 to D24, which are not particularly limited. The basic device 110 is electrically coupled to the detector 130 and may obtain power from the power supply circuit 120 to facilitate image display by a display. At least two of the power terminals N1 to N4 are electrically coupled to an external power line (not shown). For instance, the power terminals N1 and N4 may be electrically coupled to the external power line.

The power supply circuit 120 may supply power to the basic device 110 from the external power line through the bridge rectifiers D1 to D2, and the basic device 110 may control the power supply circuit 120 according to the current directions of the power terminals N1 to N4, so as to obtain power between another at least two of the power terminals N1 to N4. For instance, if the basic device 110 detects the current directions of the power terminals N1 to N4 through the detector 130 and determines that the power terminals N1 and N4 are electrically coupled to the external power line according to the current directions of the power terminals N1 to N4, the basic device 110 controls the power supply circuit 120 to obtain power between the power terminals N2 and N3. In other words, the power supply circuit 120 may generate a voltage difference between the power terminals N2 and N3. In this embodiment, the power supply circuit 120 may further include a plurality of switch circuits (not shown) and may control the switch circuits to supply power to the power terminals N1 to N4, and the switch circuits correspond to the power terminals N1 to N4. Herein, the switch circuits may be transistor switches and are not particularly limited.

In this embodiment, the detector 130 may further include a detecting circuit 1301 and a plurality of resistors R1 to R4. The resistors R1 to R4 are respectively electrically coupled between the power terminals N1 and N4 and the bridge rectifiers D1 to D2. The detecting circuit 1301 may detect voltages on the resistors R1 to R4 to determine the current directions of the currents flowing through the power terminals N1 to N4. A number of the resistors R1 to R4 corresponds to the number of the power terminals N1 to N4. Herein, the resistors R1 to R4 may have low resistances (e.g., 0.1 ohm). Nevertheless, in other embodiments of the disclosure, the detector 130 may include the detecting circuit and a current sensor or a voltage sensor of other types, which is not limited by the disclosure. In this embodiment, specifically, the processor in the basic device 110 may determine the at least two of the power terminals N1 to N4 electrically coupled to the external power line among the power terminals N1 to N4 according to the current directions of the currents flowing through the power terminals N1 to N4, so as to select another at least two of the power terminals N1 to N4. Accordingly, the processor may control the power supply circuit 120 to output power between the another at least two of the power terminals N1 to N4. In this embodiment, the power supply circuit 120 may further determine whether the another at least two of the power terminals N1 to N4 are open, so as to determine whether to stop supplying power to the outside. If the power supply circuit 120 determines that the another at least two of the power terminals N1 to N4 are open, the power supply circuit 120 stops supplying power to the outside. If the power supply circuit 120 determines that the another at least two of the power terminals N1 to N4 are not open, the power supply circuit 120 continues to output power to the outside.

Figure 2:
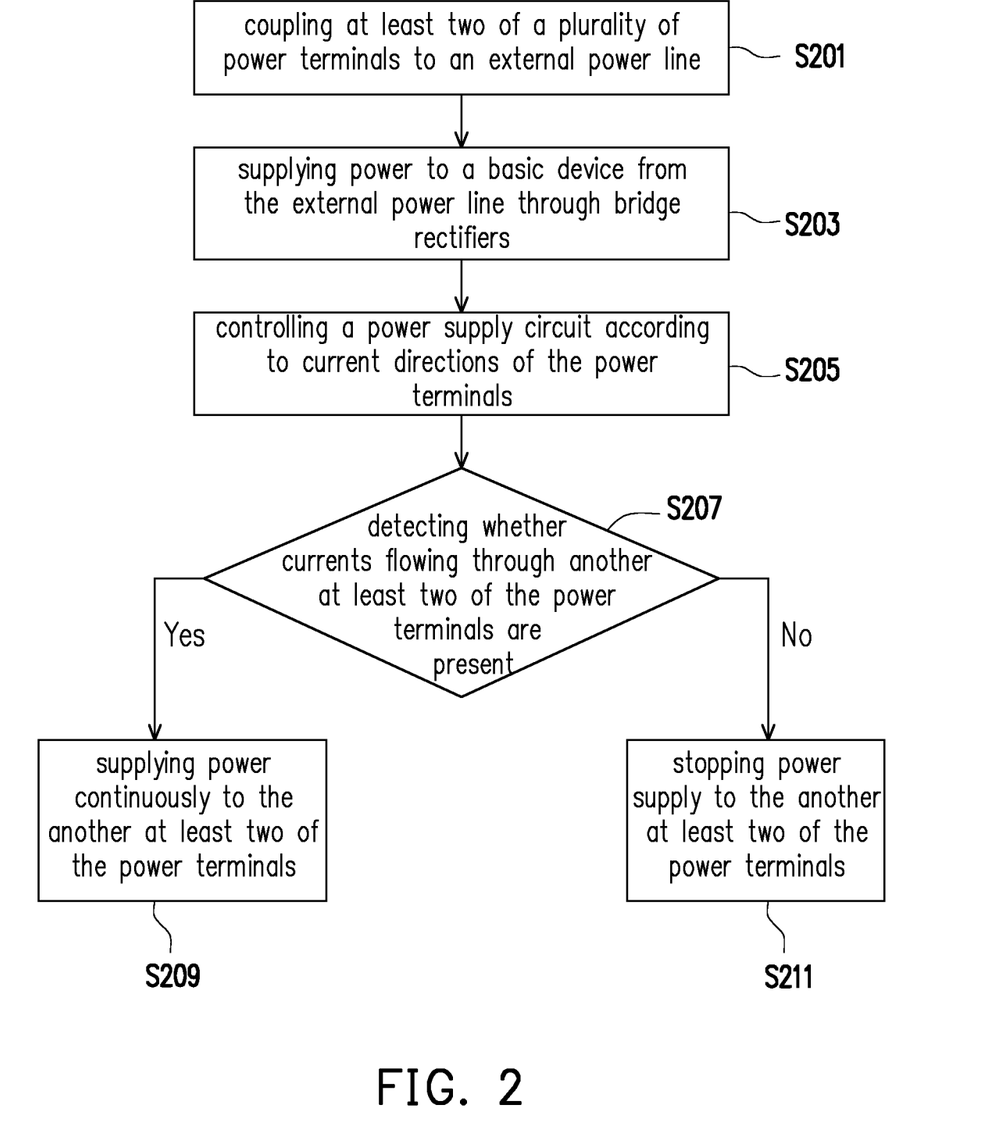
FIG. 2 is a flow chart of how an electronic photo frame supplies power to another electronic photo frame according to an embodiment of the disclosure.

Specifically, with reference to FIG. 1 and FIG. 2 together, FIG. 2 is a flow chart of how an electronic photo frame supplies power to another electronic photo frame according to an embodiment of the disclosure. In step S201, at least two power terminals are electrically coupled to an external power line. A user may enable at least two power terminals among the power terminals N1 to N4 to be electrically coupled to the external power line. In step S203, power is supplied to the basic device 110 from the external power line through the bridge rectifiers D1 to D2. To be specific, if the power terminal N1 is electrically coupled to a positive line of the external power line, a current is generated at a current path I1 to flow through the diode D14, and the generated current is imported into the power supply circuit 120. If the power terminal N1 is electrically coupled to a negative line of the external power line, a current is generated at a current path I2 to be exported from the power supply circuit 120 and to flow through the diode D13. By analogy, if the rest of the power terminals N2 to N4 are electrically coupled to the positive line or the negative line of the external power line, the currents generated by the external power line may be imported into or exported from the power supply circuit 120 through the same manner. For instance, if the power terminal N1 is electrically coupled to the negative line of the external power line and the power terminal N4 is electrically coupled to the positive line of the external power line, the power terminals N1 and N4 provide a voltage difference between terminals P1 and P2 of the power supply circuit 120 respectively through the bridge rectifiers D1 and D2, and the power supply circuit 120 supplies power to the basic device 110 according to the voltage difference through terminals P3 and P4.

In step S205, the power supply circuit 120 is controlled according to the current direction of each of the power terminals N1 to N4, so as to obtain power between the another at least two of the power terminals N1 to N4. For instance, if the power terminal N1 is electrically coupled to the negative line of the external power line and the power terminal N4 is electrically coupled to the positive line of the external power line, the detecting circuit 1301 detects the voltages on the resistors R1 to R4 and then determines that the current direction of the current flowing through the power terminal N1 is flowing out and the current direction of the current flowing through the power terminal N4 is flowing in, so as to generate and transmit a determination signal to the basic device 110. The basic device 110 controls the power supply circuit 120 to output power between the power terminals N2 and N3 according to the determination signal. Accordingly, the electronic photo frame 100 may supply power to another electronic photo frame (not shown).

In step S207, whether currents flowing through the another at least two power terminals are present are detected. For instance, if the power terminal N1 is electrically coupled to the negative line of the external power line and the power terminal N4 is electrically coupled to the positive line of the external power line, the power supply circuit 120 may detect that whether there are currents flowing in or flowing out of the power terminals N2 and N3. If the power supply circuit 120 determines that currents flowing through the another at least two of the power terminals are present, step S209 is performed. If the power supply circuit 120 determines that currents flowing through the another at least two of the power terminals are not present, step S211 is then performed. In step S209, power is continued to be supplied to the another at least two of the power terminals. In step S211, power supply to the another at least two of the power terminals is stopped. For instance, if the power supply circuit 120 determines that current flowing in the power terminal N2 is present and current flowing out of the power terminal N3 is present, the power supply circuit 120 continues to provide power between the power terminals N2 and N3. If the power supply circuit 120 determines that currents flowing through the power terminals N2 and N3 are not present, the power supply circuit 120 stops supplying power between the power terminals N2 and N3. Accordingly, whether the electronic photo frame 100 is electrically coupled to another electronic photo frame can thus be determined.

Through the foregoing electronic photo frame 100, the user may couple the positive line and the negative line of the external power line to any at least two power terminals of the electronic photo frame 100 of the disclosure. Accordingly, the user does not have to specifically consider which of the positive line or the negative line of the external power line is required to be electrically coupled to which of the power terminals of the electronic photo frame 100. In addition, the electronic photo frame 100 of the disclosure may be electrically coupled to another electronic photo frame in series through any at least two power terminals. The user does not have to identify the positive line and the negative line of the external power line to be continuously electrically coupled to the positive power terminals and the negative power terminals of all the electronic photo frames required to be connected in series.

Figure 3:
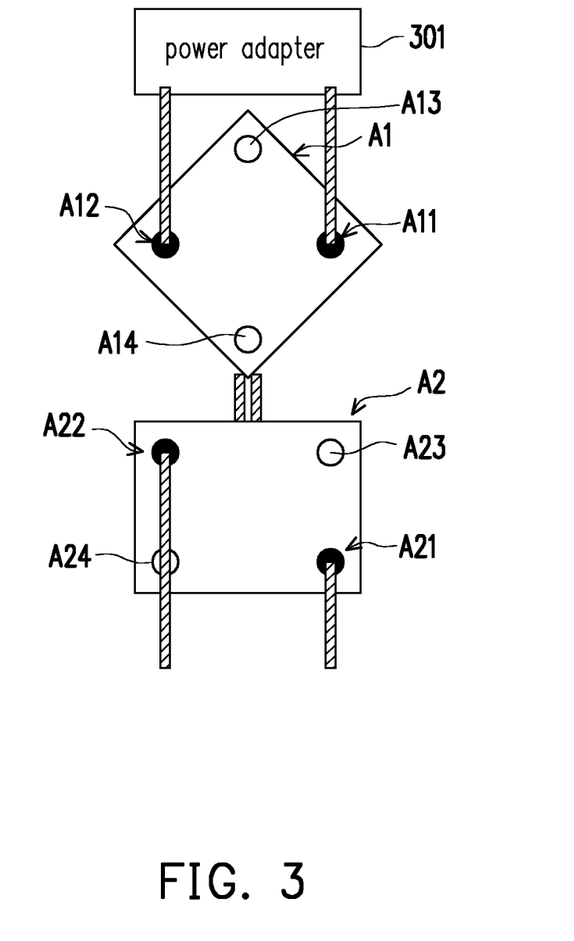
FIG. 3 is a schematic diagram of a power supply system according to an embodiment of the disclosure.

With reference to FIG. 3, FIG. 3 is a schematic diagram of a power supply system according to an embodiment of the disclosure. Power terminals A11 and A12 of a first electronic photo frame A1 may be selected to be electrically coupled to a power adapter 301 (i.e., the external power line), and power terminals A21 and A22 of a second electronic photo frame A2 may be selected by the power adapter 301 to be electrically coupled down to a third electronic photo frame. Specifically, a positive line of the power adapter 301 may be electrically coupled to the power terminal A11 of the electronic photo frame A1, and a negative line may be electrically coupled to the power terminal A12 of the electronic photo frame A1. Further, the power adapter 301 may be selectively electrically coupled to power terminals A23 and A24 of the second electronic photo frame A2 through power terminals A13 and A14. Next, the power terminals A23 and A24 may be selectively electrically coupled down to two power terminals of the third electronic photo frame. Accordingly, the power adapter 301 may supply power to the electronic photo frames A1, A2, and another electronic photo frame connected to the electronic photo frame A2 in series together.

Figure 4:
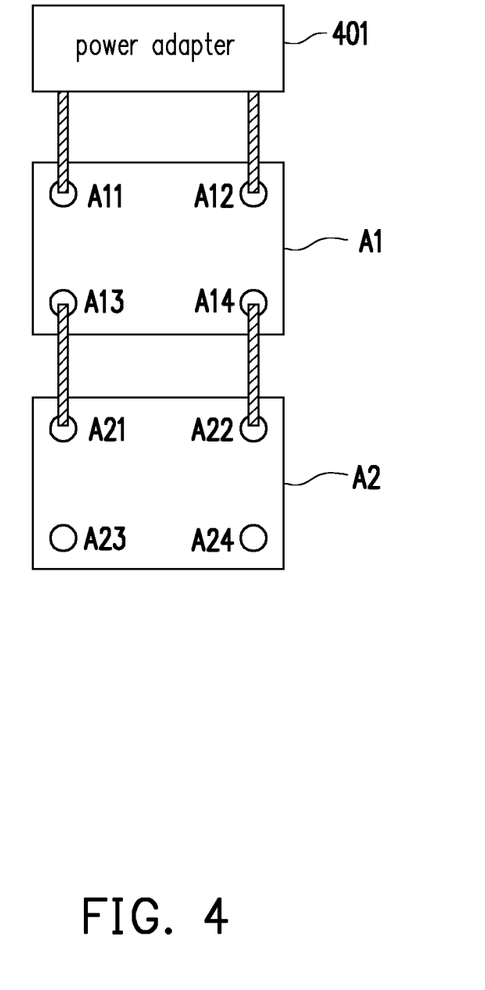
FIG. 4 is a schematic diagram of a power supply system according to another embodiment of the disclosure.

With reference to FIG. 4, FIG. 4 is a schematic diagram of a power supply system according to another embodiment of the disclosure. A power adapter 401 is electrically coupled to the power terminals A11 and A12 of the electronic photo frame A1, and the power terminals A13 and A14 of the electronic photo frame A1 are electrically coupled to the power terminals A21 and A22 of the electronic photo frame A2. Specifically, a positive line of the power adapter 401 may be electrically coupled to the power terminal A11 of the electronic photo frame A1 and a negative line of the power adapter 401 may be electrically coupled to the power terminal A12 of the electronic photo frame A1, which are not particularly limited. The power terminals A13 and A14 of the electronic photo frame A1 may supply power to the power terminals A21 and A22 of the electronic photo frame A2. For instance, the power terminal A14 of the electronic photo frame A1 may generate a greater voltage at the power terminal A22 of the electronic photo frame A2, and the power terminal A13 of the electronic photo frame A1 may generate a lower voltage at the power terminal A21 of the electronic photo frame A2. Accordingly, the power adapter 401 may supply power to the electronic photo frame A1, and the electronic photo frame A1 may continuously supply power to the electronic photo frame A2.

Figure 5:
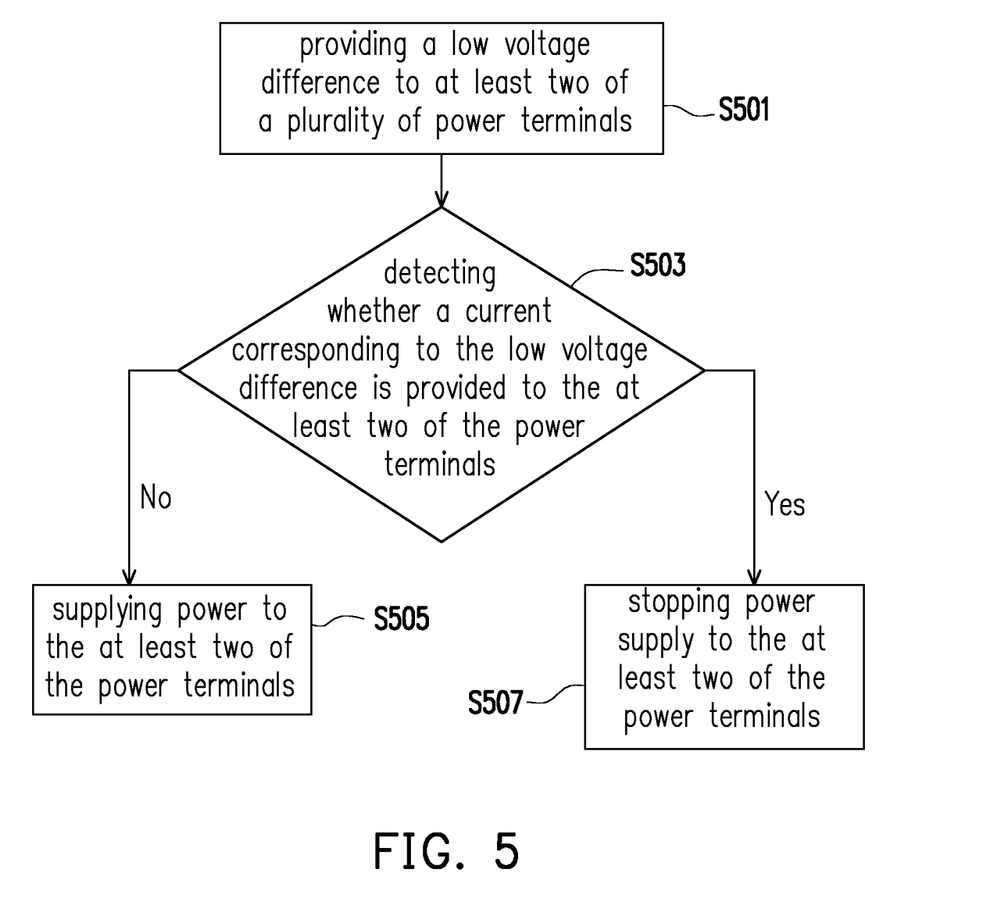
FIG. 5 is a flow chart of determining whether a short circuit is caused in the electronic photo frame by a power adapter according to an embodiment of the disclosure.

With reference to FIG. 3 and FIG. 5 together, FIG. 5 is a flow chart of determining whether a short circuit is caused in the electronic photo frame by a power adapter according to an embodiment of the disclosure. In step S501, a low voltage difference is provided to at least two of a plurality of power terminals. To be specific, before the power adapter 301 supplies power to the electronic photo frames A1 and A2, the power adapter 301 first provides a low voltage difference (e.g., may be less than a threshold voltage of the diodes of the bridge rectifier) between the power terminals A11 and A12 of the electronic photo frame A1 and between the power terminals A21 and A22 of the electronic photo frame A2. In step S503, whether a current corresponding to the low voltage difference is provided to the at least two of the power terminals is detected. To be specific, the power adapter 301 may detect whether a low current flowing through the power terminals A11 and A12 of the electronic photo frame A1 is present. If the power adapter 301 determines that a low current flowing through the power terminals A11 and A12 of the electronic photo frame A1 is not present, step S505 is performed. If the power adapter 301 determines that a low current flowing through the power terminals A11 and A12 of the electronic photo frame A1 is present, step S507 is performed.

In step S505, power is supplied to the at least two of the power terminals. To be specific, the power adapter 301 may provide power between the power terminals A11 and A12 of the electronic photo frame A1. In step S507, power supply to the at least two of the power terminals is stopped. To be specific, the power adapter 301 may stop providing the low voltage difference between the power terminals A11 and A12 of the electronic photo frame A1. According, the power adapter 301 may determine that whether connection between the power adapter 301 and the electronic photo frames A1 and A2 is short-circuited to generate a determination result. The determination result may be transmitted to basic devices of the electronic photo frames A1 and A2, and displays of the electronic photo frames A1 and A2 may display the determination result to inform the user. The power adapter 301 may inform the user of the determination result through a wired or wireless manner, which is not particularly limited. In addition, communication modules of the basic devices of the electronic photo frames A1 and A2 may include network units. The electronic photo frames A1 and A2 may transmit the determination result to the network through the network units.

Through the foregoing power adapter 301, before power is supplied to the electronic photo frames A1 and A2, the power adapter 301 of the disclosure may detect whether the connection between the power adapter 301 and the electronic photo frames A1 and A2 is short-circuited.

Figure 6:
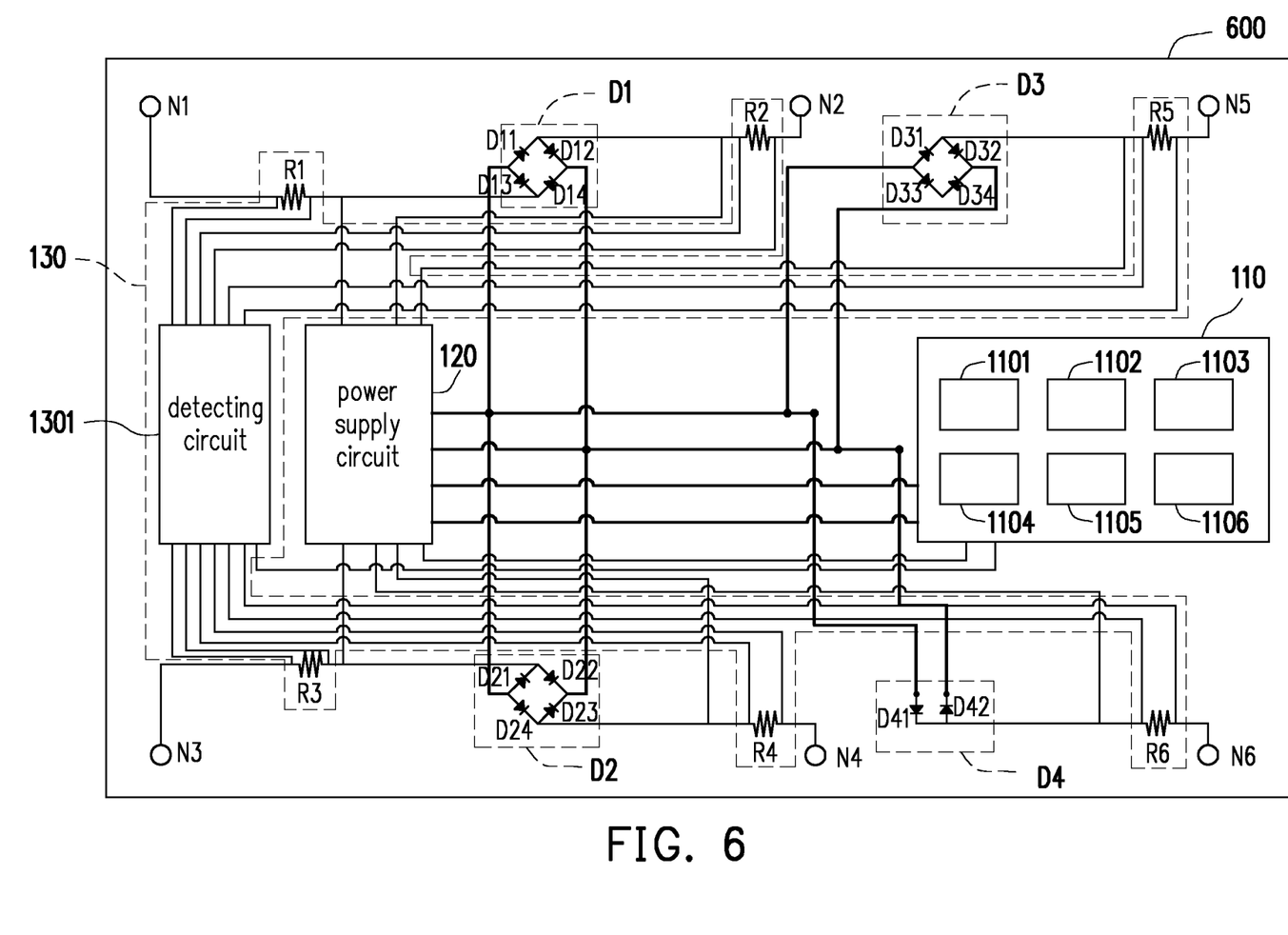
FIG. 6 is a schematic diagram of an electronic photo frame according to another embodiment of the disclosure.

With reference to FIG. 6, FIG. 6 is a schematic diagram of an electronic photo frame according to another embodiment of the disclosure. Comparing to the electronic photo frame of FIG. 1, an electronic photo frame 600 of this embodiment further includes power terminals N5 to N6, bridge rectifiers D3 to D4, and resistors R5 to R6. Similarly, the power terminal N5 is electrically coupled to the bridge rectifier D3, and the power terminal N6 is electrically coupled to the bridge rectifier D4. The detector 130 is electrically coupled to the power terminals N5 to N6 and detects current directions of currents flowing through the power terminals N5 to N6. The power supply circuit 120 is electrically coupled to the power terminal N5 through the bridge rectifier D3 and is electrically coupled to the power terminal N6 through the bridge rectifier D4. Herein, the bridge rectifier D3 may be composed of diodes D31 to D34 and the bridge rectifier D4 may be composed of diodes D41 to D42, which are not particularly limited. At least two of the power terminals N1 to N6 are electrically coupled to an external power line (not shown). The power supply circuit 120 supplies power to the basic device 110 from the external power line through the bridge rectifiers D1 to D4, and the basic device 110 may control the power supply circuit 120 according to the current directions of the power terminals N1 to N6, so as to obtain power between another at least two of the power terminals N1 to N6.

In this embodiment, the detector 130 may further include a detecting circuit 1301 and a plurality of resistors R1 to R6. The resistors R1 to R6 are respectively electrically coupled between the power terminals N1 and N6 and the bridge rectifiers D1 to D4. The detecting circuit 1301 may detect voltages on the resistors R1 to R6 to determine the current directions of the currents flowing through the power terminals N1 to N6. A number of the resistors R1 to R6 corresponds to a number of the power terminals N1 to N6. Herein, the resistors R1 to R6 may have low resistances. In FIG. 6, the reference numerals identical to that in FIG. 1 are used to represent the same elements featuring the same functions, and details of such elements which are described in FIG. 1 are not repeated hereinafter.

Figure 7:
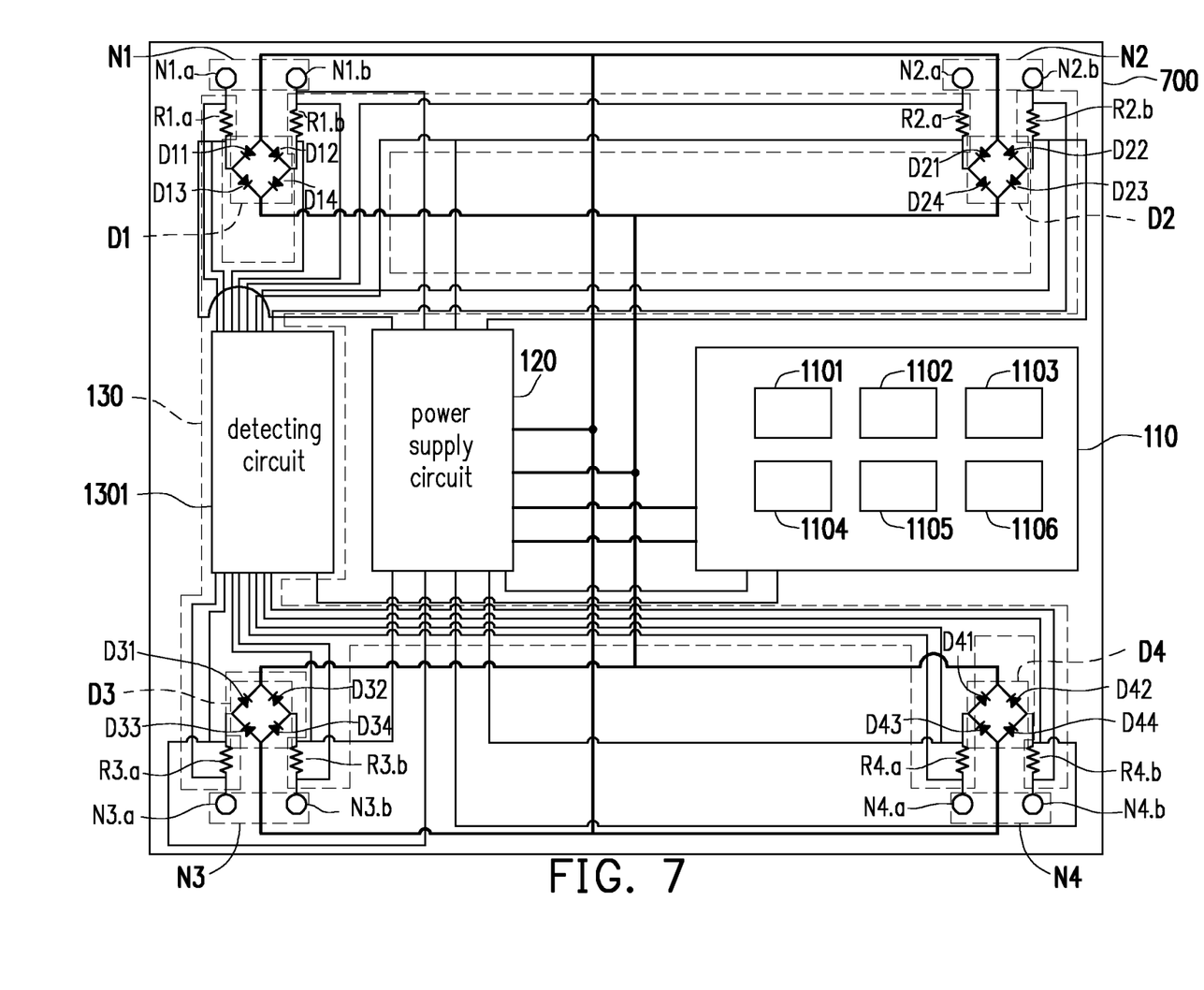
FIG. 7 is a schematic diagram of an electronic photo frame according to another embodiment of the disclosure.

With reference to FIG. 7, FIG. 7 is a schematic diagram of an electronic photo frame according to another embodiment of the disclosure. Comparing to the electronic photo frame of FIG. 1, in an electronic photo frame 700 of this embodiment, each of the power terminals has two power terminals. In the electronic photo frame 700, the power terminal N1 includes power terminals N1.a and N1.b, the power terminal N2 includes the power terminals N2.a and N2.b, the power terminal N3 includes the power terminals N3.a and N3.b, and the power terminal N4 includes the power terminals N4.a and N4.b. The power terminals N1.a and N1.b are electrically coupled to the bridge rectifier D1, the power terminals N2.a and N2.b are electrically coupled to the bridge rectifier D2, the power terminals N3.a and N3.b are electrically coupled to the bridge rectifier D3, and the power terminals N4.a and N4.b are electrically coupled to the bridge rectifier D4. The detector 130 is electrically coupled to the power terminals N1.a to N4.b and detects current directions of currents flowing through the power terminals N1.a to N4.b. The power supply circuit 120 is electrically coupled to the power terminals N1.a and N1.b through the bridge rectifier D1, is electrically coupled to the power terminals N2.a and N2.b through the bridge rectifier D2, is electrically coupled to the power terminals N3.a and N3.b through the bridge rectifier D3, and is electrically coupled to the power terminals N4.a and N4.b through the bridge rectifier D4. Herein, the bridge rectifier D1 may be composed of diodes D11 to D14, the bridge rectifier D2 may be composed of diodes D21 to D24, the bridge rectifier D3 may be composed of diodes D31 to D34, and the bridge rectifier D4 may be composed of diodes D41 to D44, which are not particularly limited. The basic device 110 is electrically coupled to the detector 130 and obtains power from the power supply circuit 120 to display an image on a display. At least two of the power terminals N1.a to N4.b are electrically coupled to an external power line (not shown). For instance, the power terminals N1.a and N1.b may be electrically coupled to the external power line.

The power supply circuit 120 supplies power to the basic device 110 from the external power line through the bridge rectifier D1, and the basic device 110 may control the power supply circuit 120 according to the current directions of the power terminals N1.a to N4.b, so as to obtain power between another at least two of the power terminals N1.a to N4.b. For instance, if the basic device 110 detects the current directions of the power terminals N1.a to N4.b through the detector 130 and determines that the power terminals N1.a and N1.b are electrically coupled to the external power line according to the current directions of the power terminals N1.a to N4.b, the basic device 110 controls the power supply circuit 120 to obtain power between the power terminals N2.b and N3.b. In other words, the power supply circuit 120 may generate a voltage difference between the power terminals N2.b and N3.b. In this embodiment, the power supply circuit 120 may further include a plurality of switch circuits (not shown) and may control the switch circuits to supply power to the power terminals N1.a to N4.b, and the switch circuits correspond to the power terminals N1.a to N4.b. Herein, the switch circuits may be transistor switches and are not particularly limited.

In this embodiment, the detector 130 may further include a detecting circuit 1301 and a plurality of resistors R1.a to R4.b. The resistors R1.a and R1.b are electrically coupled between the power terminals N1.a and N1.b and the bridge rectifier D1, the resistors R2.a and R2.b are electrically coupled between the power terminals N2.a and N2.b and the bridge rectifier D2, the resistors R3.a and R3.b are electrically coupled between the power terminals N3.a and N3.b and the bridge rectifier D3, and the resistors R4.a and R4.b are electrically coupled between the power terminals N4.a and N4.b and the bridge rectifier D4. The detecting circuit 1301 may detect voltages on the resistors R1.a to R4.b to determine the current directions of the currents flowing through the power terminals N1.a to N4.b. A number of the resistors R1.a to R4.b corresponds to a number of the power terminals N1.a to N4.b. Herein, the resistors R1.a to R4.b may have low resistances (e.g., 0.1 ohm). In this embodiment, the processor of the basic device 110 may determine the at least two of the power terminals N1.a to N4.b electrically coupled to the external power line among the power terminals N1.a to N4.b according to the current directions of the currents flowing through the power terminals N1.a to N4.b, so as to select another at least two of the power terminals N1.a to N4.b. Accordingly, the processor controls the power supply circuit 120, so as to obtain power between the another at least two of the power terminals N1.a to N4.b. In this embodiment, the power supply circuit 120 may further determine whether the another at least two of the power terminals N1.a to N4.b are open, so as to determine whether to stop supplying power. If the power supply circuit 120 determines that the another at least two of the power terminals N1.a to N4.b are open, the power supply circuit 120 stops supplying power. If the power supply circuit 120 determines that the another at least two of the power terminals N1.a to N4.b are not open, the power supply circuit 120 continues to supply power.

Through the foregoing electronic photo frame 700, when the user is required to apply a voltage difference to one single power terminal of the electronic photo frame 700, the voltage difference may be applied to the two power terminals included in one of the power terminals N1 to N4. Accordingly, the positive line and the negative line of the external power line may randomly be electrically coupled to any power terminals of the electronic photo frame 700.

Figure 8:
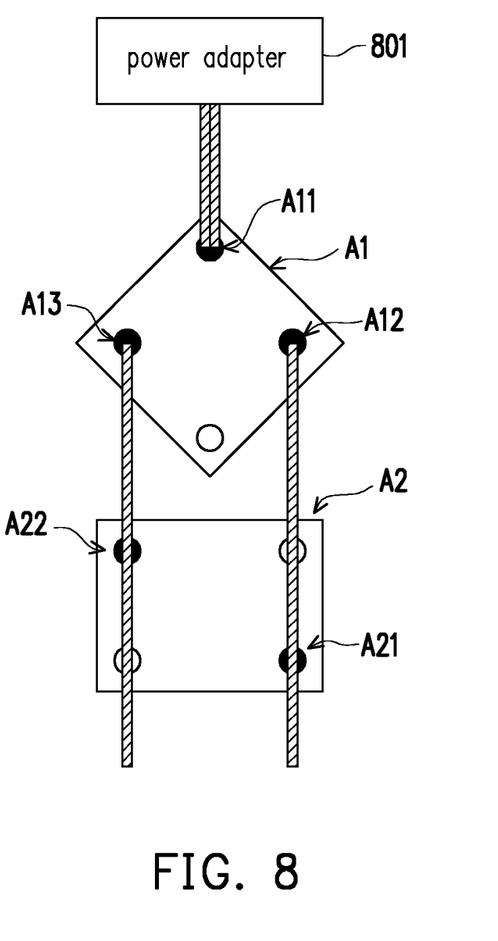
FIG. 8 is a schematic diagram of an electronic photo frame being connected to another electronic photo frame according to another embodiment of the disclosure.

With reference to FIG. 8, FIG. 8 is a schematic diagram of an electronic photo frame being connected to another electronic photo frame according to another embodiment of the disclosure. In FIG. 8, the electronic photo frames A1 and A2 may include elements similar to that of the electronic photo frame of FIG. 7, and the elements feature the same functions. A power adapter 801 is electrically coupled to the power terminal A11 of the electronic photo frame A1, and the power terminals A12 and A13 of the electronic photo frame A1 are respectively electrically coupled to the power terminals A21 and A22 of the electronic photo frame A2. A positive line and a negative line of the power adapter 801 may be electrically coupled to the power terminal A11 of the electronic photo frame A1, which are not particularly limited. The power terminals A12 and A13 of the electronic photo frame A1 may supply power to the power terminals A21 and A22 of the electronic photo frame A2. For instance, the power terminal A12 of the electronic photo frame A1 may generate a greater voltage at the power terminal A21 of the electronic photo frame A2, and the power terminal A13 of the electronic photo frame A1 may generate a lower voltage at the power terminal A22 of the electronic photo frame A2. Accordingly, the power adapter 801 may supply power to the electronic photo frame A1, and the electronic photo frame A1 may supply power to the electronic photo frame A2.

Figure 9:
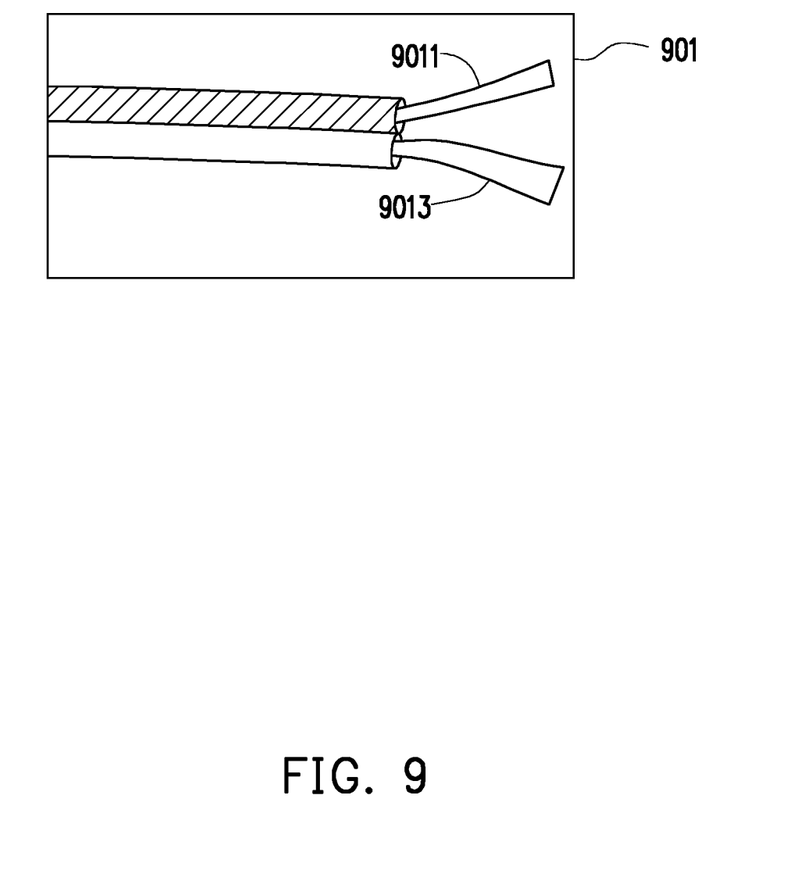
FIG. 9 is a schematic view of an external power line connected to the electronic photo frame according to another embodiment of the disclosure.

With reference to FIG. 9, FIG. 9 is a schematic view of an external power line matched with and connected to the electronic photo frames of FIG. 7 and FIG. 8. When the user has to apply a voltage difference to one single power terminal of the electronic photo frame, an external power line 901 may be adopted. For instance, the external power line 901 may be adopted between the power adapter 801 of FIG. 8 and the power terminal A11 of the electronic photo frame A1. Such external power line 901 includes one positive line 9011 and one negative line 9013.

Figure 10:
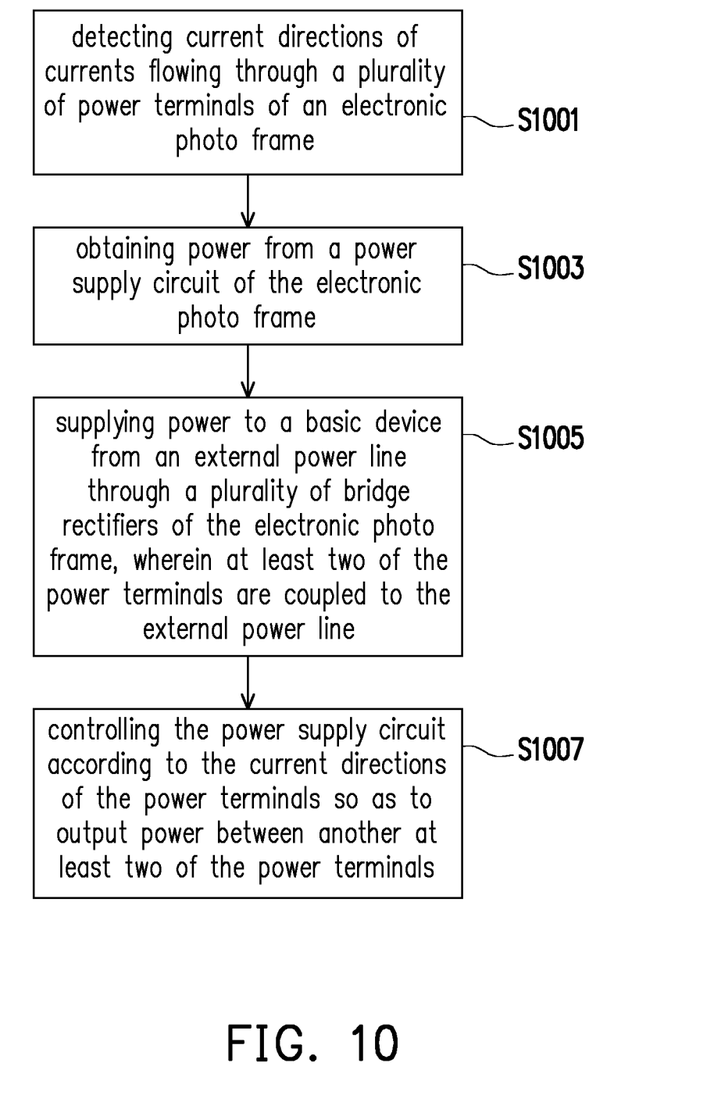
FIG. 10 is a flow chart of a power supply method according to an embodiment of the disclosure.

With reference to FIG. 10, FIG. 10 is a flow chart of a power supply method according to an embodiment of the disclosure. In step S1001, current directions of currents flowing through a plurality of power terminals of an electronic photo frame are detected. In step S1003, power is obtained from a power supply circuit of the electronic photo frame. In step S1005, power is supplied to a basic device from an external power line through a plurality of bridge rectifiers of the electronic photo frame. Herein, at least two of the power terminals are electrically coupled to the external power line. In step S1007, the power supply circuit is controlled according to the current directions of the power terminals so that power is outputted between another at least two of the power terminals.

Implementation details of the power supply method are described in the foregoing embodiments, and a relevant description thereof is thus omitted.

In view of the foregoing, in the electronic photo frame provided by the disclosure, random power terminals may be selectively electrically coupled to the external power line, and the external power line may be used to hang the electronic photo frame. Accordingly, the user does not have to specifically consider which of the positive line or the negative line of the external power line is required to be electrically coupled to which of the power terminals. In addition, the power supply system provided by the disclosure may detect whether a short circuit is caused in the electronic photo frame electrically coupled to the power adapter.

In addition, the electronic photo frame in each of the embodiments is exemplified as the main object; nevertheless, the disclosure is not limited thereto. Any electronic device required to be connected in series in terms of power supply may be applied and falls within the scope sought to be protected by the disclosure.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device, electrically coupled to an external power line to be supplied power by the external power line, the electronic device comprising:
   a plurality of power terminals;
   a plurality of bridge rectifiers, each of the plurality of bridge rectifiers is electrically coupled to at least one of the power terminals;
   a detector, electrically coupled to the power terminals, configured to detect current directions of currents flowing through each of the plurality of the power terminals;

a power supply circuit, electrically coupled to the power terminals through the bridge rectifiers; and a basic device, electrically coupled to the detector, obtaining power from the power supply circuit;

wherein at least two of the power terminals are selectively electrically coupled to the external power line, the power supply circuit supplies power to the basic device from the external power line through the bridge rectifiers, and the basic device controls the power supply circuit according to the current directions of the at least two power terminals electrically coupled to the external power line so as to output the power between another at least two of the power terminals, wherein the basic device comprises a processor, and the processor determines which power terminals are the at least two power terminals electrically coupled to the external power line among the power terminals according to the current directions of the currents flowing through the power terminals so as to select and output the power to the another at least two of the power terminals.

2. The electronic device as claimed in claim 1, wherein the electronic device is an electronic photo frame, and the basic device comprises a display and drives the display to display an image when the basic device obtains power from the power supply circuit.

3. The electronic device as claimed in claim 1, wherein the detector further comprises:

a detecting circuit;

a plurality of resistors, each of the resistors is electrically coupled between each of the power terminals and the plurality of bridge rectifiers electrically coupled thereto, wherein the detecting circuit detects voltages on the resistors to determine the current directions of the currents flowing through the power terminals.

4. The electronic device as claimed in claim 1, wherein the power supply circuit determines that whether the another at least two of the power terminals are open to determine whether to stop outputting the power.

5. The electronic device as claimed in claim 4, wherein the power supply circuit stops outputting the power in response to determination that the another at least two of the power terminals are open.

6. The electronic device as claimed in claim 4, wherein the power supply circuit outputs the power in response to determination that the another at least two of the power terminals are not open.

7. A power supply system, comprising:

a power adapter, electrically coupled to an external power line;

a plurality of power terminals;

a plurality of bridge rectifiers, each of the plurality of bridge rectifiers is electrically coupled to at least one of the power terminals;

a detector, electrically coupled to the power terminals, configured to detect current directions of currents flowing through each of the power terminals;

a power supply circuit, electrically coupled to the power terminals through the bridge rectifiers; and a basic device, electrically coupled to the detector, obtaining power from the power supply circuit;

wherein at least two of the power terminals are selectively electrically coupled to the external power line, the power supply circuit supplies power to the basic device from the external power line through the bridge rectifiers, and the basic device controls the power supply circuit according to the current directions of the at least two power terminals electrically coupled to the external power line so as to output the power between another at least two of the power terminals, wherein the basic device comprises a processor, and the processor determines which power terminals are the at least two power terminals electrically coupled to the external power line among the power terminals according to the current directions of the currents flowing through the power terminals so as to select and output the power to the another at least two of the power terminals.

8. The power supply system as claimed in claim 7, wherein the basic device comprises a display and drives the display to display an image when the basic device obtains power from the power supply circuit.

9. The power supply system as claimed in claim 7, wherein the processor determines which power terminals are the at least two power terminals electrically coupled to the external power line among the power terminals according to the current directions of the currents flowing through the power terminals by detecting a low voltage difference provided by the power adapter to the at least two of the power terminals electrically coupled to the external power line and by detecting whether a current corresponding to a low voltage flows through the at least two of the power terminals, wherein the power adapter outputs the power to the at least two of the power terminals if the power adapter does not detect that the current corresponding to the low voltage flows through the at least two of the power terminals.

10. A power supply method, used by an electronic device and a power adapter, wherein the power adapter is electrically coupled to the electronic device through an external power line, and the power supply method comprises:

detecting current directions of currents flowing through each of a plurality of power terminals of the electronic device;

obtaining power from a power supply circuit of the electronic device;

supplying power to a basic device from the external power line through a plurality of bridge rectifiers electrically coupled between the power terminals and the power supply circuit in the electronic device, wherein at least two of the power terminals are selectively electrically coupled to the external power line; and controlling the power supply circuit by the basic device according to current directions of the at least two power terminals to output the power between another at least two of the power terminals, wherein the basic device comprises a processor, and the processor is configured to:

determining which power terminals are the at least two power terminals electrically coupled to the external power line among the power terminals according to the current directions of the currents flowing through the power terminals to select and output the power to the another at least two of the power terminals.

11. The power supply method as claimed in claim 10, wherein determining which power terminals are the at least two power terminals electrically coupled to the external power line among the power terminals according to the current directions of the currents flowing through the power terminals comprising:

using the processor to detect a low voltage difference to the at least two of the power terminals electrically coupled to the external power line and to detect whether a current corresponding to the low voltage difference flows through the at least two of the power terminals, wherein the power is outputted to the at least two of the power terminals when the power adapter does not detect that the current corresponding to the low voltage difference flows through the at least two of the power terminals.

\* \* \* \* \*